(12) United States Patent
Stewart et al.

(10) Patent No.: US 11,562,032 B1
(45) Date of Patent: Jan. 24, 2023

(54) APPARATUS AND METHODS FOR UPDATING A USER PROFILE BASED ON A USER FILE

(71) Applicant: MY JOB MATCHER, INC., Austin, TX (US)

(72) Inventors: Arran Stewart, Austin, TX (US); Steve O'Brien, Raleigh, NC (US)

(73) Assignee: MY JOB MATCHER, INC., Austin, TX (US)

( * ) Notice: Subject to any disclaimer, the term of this patent is extended or adjusted under 35 U.S.C. 154(b) by 0 days.

(21) Appl. No.: 17/667,479

(22) Filed: Feb. 8, 2022

(51) Int. Cl.
| | | |
|---|---|---|
| *G06F 16/93* | (2019.01) | |
| *G06F 16/906* | (2019.01) | |
| *G06F 16/9035* | (2019.01) | |
| *G06F 17/00* | (2019.01) | |
| *G06N 20/00* | (2019.01) | |

(52) U.S. Cl.
CPC ............ *G06F 16/93* (2019.01); *G06F 16/906* (2019.01); *G06F 16/9035* (2019.01); *G06N 20/00* (2019.01)

(58) Field of Classification Search
CPC .... G06F 16/93; G06F 16/906; G06F 16/9035; G06N 20/00
USPC ................................................. 715/234, 255
See application file for complete search history.

(56) References Cited

U.S. PATENT DOCUMENTS

| | | | | |
|---|---|---|---|---|
| 6,199,067 B1* | 3/2001 | Geller | ................. | G06F 16/9535 |
| | | | | 707/999.005 |
| 8,073,847 B2* | 12/2011 | Kim | ...................... | G06Q 50/01 |
| | | | | 707/732 |
| 8,352,311 B2 | 1/2013 | Twyman | | |
| 8,555,157 B1* | 10/2013 | Fu | .......................... | G06F 16/972 |
| | | | | 715/201 |
| 9,104,748 B2* | 8/2015 | Solheim | .................. | G06F 16/93 |
| 9,245,010 B1* | 1/2016 | Donneau-Golencer | ...................... | |
| | | | | G06F 16/22 |
| 11,176,271 B1 | 11/2021 | Garg et al. | | |
| 2003/0074409 A1* | 4/2003 | Bentley | .................. | H04L 67/30 |
| | | | | 709/224 |
| 2004/0098386 A1* | 5/2004 | Thint | ..................... | G06Q 30/02 |

(Continued)

FOREIGN PATENT DOCUMENTS

WO 2019108133 A1 6/2019

OTHER PUBLICATIONS

Tawnya, Build Profile from Resume, Feb. 28, 2021.

(Continued)

*Primary Examiner* — Manglesh M Patel
(74) *Attorney, Agent, or Firm* — Caldwell Intellectual Property Law

(57) ABSTRACT

An apparatus for updating a user profile based on a user file is included. Apparatus may include a processor and a memory communicatively connected to processor. Memory may contain instructions configuring processor to identify a plurality of profile sections in a user profile comprising a profile content; receive a user file; parse document content in user file by identifying a plurality of document sections in user file, categorizing a first document section of plurality of document sections of user file, identifying at least a document subsection of first document section, and categorizing document content in a first document subsection of at least a document subsection; and insert document content in at least one of the plurality of profile sections based on categorization of first document section and categorization of first document subsection.

20 Claims, 8 Drawing Sheets

(56) References Cited

U.S. PATENT DOCUMENTS

| | | | |
|---|---|---|---|
| 2006/0075332 A1* | 4/2006 | Fairweather | G06Q 10/10 |
| | | | 709/205 |
| 2009/0055404 A1* | 2/2009 | Heiden | G06Q 30/02 |
| 2010/0144318 A1* | 6/2010 | Cable | H04L 67/306 |
| | | | 455/414.2 |
| 2011/0107294 A1* | 5/2011 | Ionfrida | H04L 47/70 |
| | | | 717/101 |
| 2014/0089303 A1 | 3/2014 | Ali et al. | |
| 2015/0127565 A1 | 5/2015 | Chevalier et al. | |
| 2016/0125360 A1 | 5/2016 | Ali et al. | |
| 2018/0060823 A1 | 3/2018 | Garimella et al. | |
| 2020/0394615 A1 | 12/2020 | Sethre et al. | |
| 2021/0279688 A1 | 9/2021 | Boddapu | |

OTHER PUBLICATIONS

SAP, Resume Parsing—SAP Help Portal, Dec. 31, 2021.
Alutiiq, LLC, Careers with Alutiiq, LLC and Its Subsidiaries, Dec. 31, 2021.

\* cited by examiner

APPARATUS AND METHODS FOR UPDATING A USER PROFILE BASED ON A USER FILE

FIELD OF THE INVENTION

The present invention generally relates to the field social profiles. In particular, the present invention is directed to apparatus and methods for updating a user profile based on a user file.

BACKGROUND

Analysis and classification of document content is too inefficient and reliant on metadata characterization of the same.

SUMMARY OF THE DISCLOSURE

In an aspect of the present disclosure is an apparatus for updating a user profile based on a user file, the apparatus including at least a processor and a memory communicatively connected to the processor, the memory containing instructions configuring the at least a processor to: identify a plurality of profile sections in a user profile comprising a profile; receive a user file; parse document content in the user file by: identifying a plurality of document sections in the user file; categorizing a first document section of the plurality of document sections of the user file; identifying at least a document subsection of the first document section; and categorizing the document content in a first document subsection of the at least a document subsection; and insert the document content in at least one of the plurality of profile sections based on the categorization of the first document section and the categorization of the first document subsection.

In another aspect of the present disclosure is a method for updating a user profile based on a user file, the method including identifying a plurality of profile sections in a user profile comprising a profile content; receiving a user file; parsing document content in the user file by: identifying a plurality of document sections in the user file; categorizing a first document section of the plurality of document sections of the user file; identifying at least a document subsection of the first document section; and categorizing the content in a first document subsection of the at least a document subsection; and inserting the document content in at least one of the plurality of profile sections based on the categorization of the first document section and the categorization of the first document subsection.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
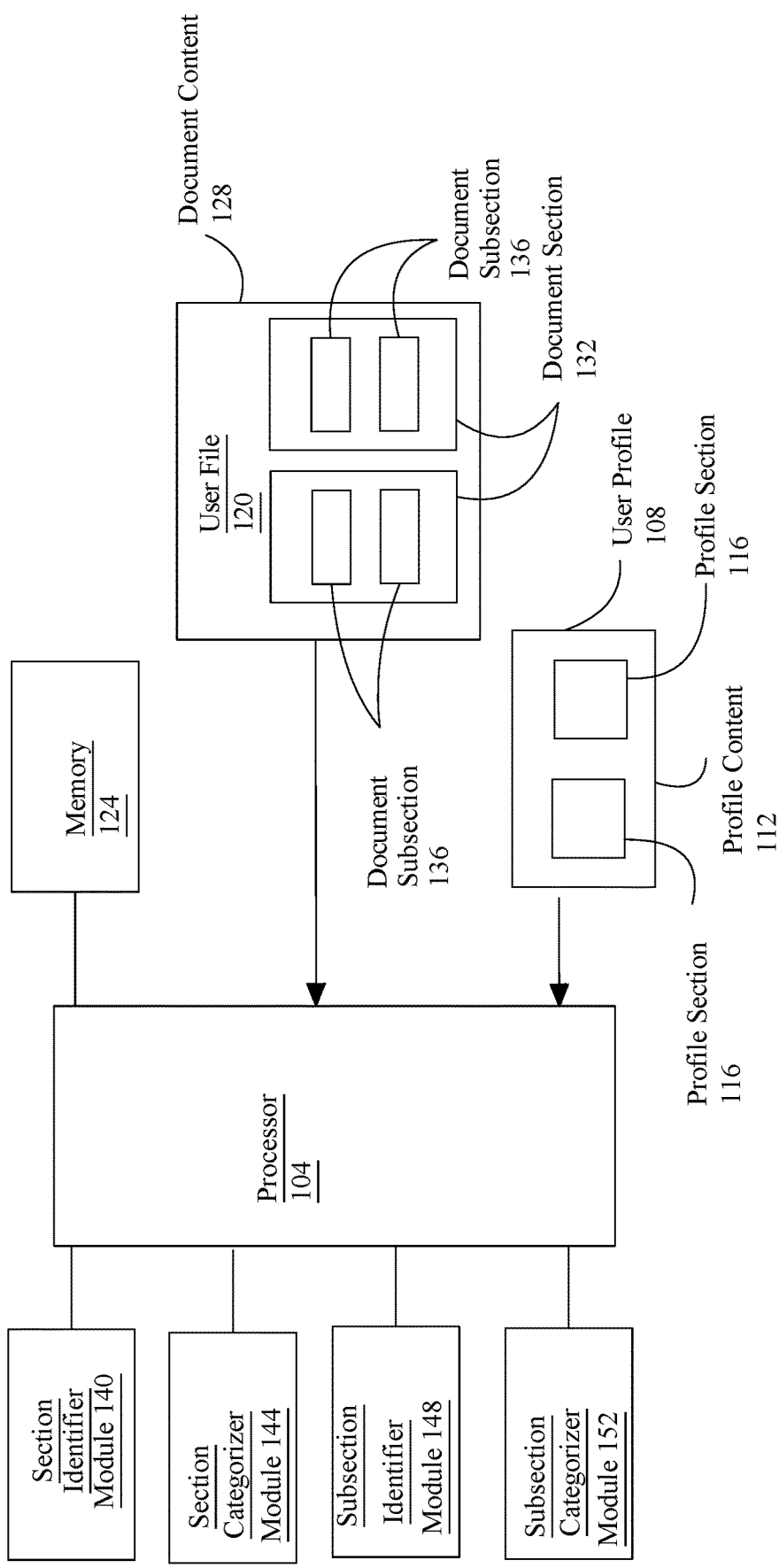
FIG. 1 is a block diagram of an embodiment of an apparatus for updating a user profile based on a user file.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for updating a user profile based on a user file. In an embodiment, an apparatus may include a processor communicatively connected to a user profile, the user profile including a profile content, and a memory communicatively connected to processor. Memory may contain instructions configuring processor to identify a plurality of profile sections in user profile; receive a user file; parse a document content in user file by identifying a plurality of document sections in user file, categorizing a first document section of plurality of document sections of user file, identifying at least a document subsection of first document section, and categorizing document content in a first document subsection of at least a document subsection; and insert document content in at least one of the plurality of profile sections based on categorization of first document section and categorization of first document subsection.

Aspects of the present disclosure can be used to automate the incorporation of information from the user file onto the user profile. The processor may use one or more machine-learning processes for parsing, such as to parse the document content in the user file, including analyzing the syntax and/or diction of the document content. The processor may match the syntax and/or diction of document content in user file to that of content in the user profile so content being added from the user file will be consistent with the existing content on the user profile. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof, for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Now referring to FIG. 1, an apparatus for updating a user profile based on a user file is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Processor 104 may be communicatively connected to a user profile 108. As used in this disclosure, a "user profile" is one or more digital pages that hosts information about a user and/or information added by the user. As discussed above, apparatus 100 may be communicatively connected a network. User profile 108 may be on network. "Communicatively connected," for the purposes of this disclosure, is a process whereby one device, component, or circuit is able to receive data from and/or transmit data to another device, component, or circuit. Communicative connection may be performed by wired or wireless electronic communication, either directly or by way of one or more intervening devices or components. In an embodiment, communicative connection includes electrically connection an output of one device, component, or circuit to an input of another device, component, or circuit. Communicative connection may be performed via a bus or other facility for intercommunication between elements of a computing device. Communicative connection may include indirect connections via "wireless" connection, low power wide area network, radio communication, optical communication, magnetic, capacitive, or optical connection, or the like. In an embodiment, communicative connecting may include electrically connecting an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical connection, or the like.

Still referring to FIG. 1, user profile 108 may be for a social networking platform such as, for example, career and employment networking among employees, contractors, employers, business entities, and/or the like. Platform may host job postings from employees who seek the filling of a job position. User profile 108 may provide a presence on platform for a prospective employee, as a user, to find employment. User profile 108 may include profile content 112. Profile content 112 may include information about user, for example, address, email address, physical address, phone number, skills, accreditations, university attended, grade point average (GPA), degree, major and/or focus of study, minor, prior employment, experience, extracurricular activities, accolades, and/or the like. Profile content 112 may provide one or more spaces for information about user to be added.

Processor 104 may be configured to identify a plurality of profile sections 116 in the user profile 108. User profile 108 may include a plurality of profile sections 116. As used in this disclosure, a "profile section" is an identified section in a user profile 108. Profile section 116 may be categorized, the category of which may be identified by a heading. Categories may include, for example, personal information, current employment, former employment, education, and/or the like. Profile content 112 may be organized by profile section 116. For example, address, email address, physical address, and phone number may be in profile section 116 titled personal information; university attended, grade point average (GPA), degree, major and/or focus of study, minor, extracurricular activities, and accolades may be in profile section 116 titled education.

With continued reference to FIG. 1, processor 104 may be configured to receive a user file 120. As used in this disclosure, a "user file" is a file from a user or on the user's behalf containing information about the user. User file 120 may include an audio file, a video file, and/or a document file. User file 120 may be a user's resume. Processor 104 may receive user file 120 from a user, such as a prospective employee. User file 120 may include a video resume. As used in this disclosure, a "video resume" is data including an audio recording of a user, such as a prospective employee, for purposes of potentially acquiring a job. The audio recording may include verbal content. As used in this disclosure, "verbal content" is comprehensible language-based communication. For example, verbal content may include a monologue. Verbal content may be audible verbal content and/or visual verbal content. Video resume may also include a visual recording of the prospective employee. Visual recording may include an image component. As used in this disclosure, "image component" may be a visual representation of information, such as a plurality of temporally sequential frames and/or pictures, related to video resume. For example, image component may include animations, still imagery, recorded video, and the like. Processor 104 may be configured to extract verbal content, including audible verbal content and visual verbal content from video resume, and incorporate the content into profile sections 116. Additional disclosure pertaining to video recording and verbal content can be found in U.S. patent application Ser. No. 17/582,070 filed on Jan. 24, 2022 and entitled "APPARATUSES AND METHODS FOR PARSING AND COMPARING VIDEO RESUME DUPLICATIONS," the entirety of which in incorporated herein by reference.

Processor 104 may receive user file 120 from a computing device through a network, from a database, and or store user file 120 in a memory and retrieve from the memory. Apparatus 100 may include a memory 124. Memory 124 may be communicatively connected to processor 104 and may be configured to store information and/or datum related to apparatus 100, such as user file 120 and/or user profile 108. In one or more embodiments, memory 124 may be communicatively connected to a processor and configured to contain instructions configuring processor to execute any operations discussed in this disclosure. In one or more embodiments, memory 124 may include a storage device, as described further in this disclosure below. User file 120 may include document content 128. Document content 128 may include information about user pertaining to qualifications of the user and may include, for example, address, email address, physical address, phone number, skills, accreditations, university attended, grade point average (GPA), degree, major and/or focus of study, minor, prior employment, experience, extracurricular activities, accolades, and/or the like.

Processor 104 may be configured to parse document content 128 in user file 120. Processor 104 may be configured to conduct optical character recognition or optical character reader (OCR) on user file 120. In some embodiments, OCR includes automatic conversion of images of written (e.g., typed, handwritten or printed text) into machine-encoded text. In some cases, recognition of at least a keyword from user file 120 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component 124. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to document content 128 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of user file 120. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component 124.

Still referring to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the user file 120. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into at least a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 2. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, Calif., United States.

Still referring to FIG. 1, in some cases, OCR may employ a two-pass approach to character recognition. A first pass may try to recognize a character. Each character that is satisfactory is passed to an adaptive classifier as training data. The adaptive classifier then gets a chance to recognize characters more accurately as it further analyzes document content 128. Since the adaptive classifier may have learned something useful a little too late to recognize characters on the first pass, a second pass is run over document content 128. Second pass may include adaptive recognition and use characters recognized with high confidence on the first pass to recognize better remaining characters on the second pass. Another exemplary OCR software tool include OCRopus. OCRopus development is led by German Research Centre for Artificial Intelligence in Kaiserslautern, Germany. In some cases, OCR software may employ neural networks.

Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of document content 128. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of apriori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 104 may parse document content 128 by identifying a plurality of document sections 132 in user file 120, categorizing a first document section of document sections 132 of user file 120, identifying at least a document subsection of first document section 132, and categorizing document content 128 in a first document subsection 136 of document subsection. As used in this disclosure, a "document section" is an identified section in a user file 120. Document sections 132 may each be categorized, the categories of which may be identified by a heading. Categories may include, for example, personal information, current employment, former employment, education, and/or the like. Document content 128 may be organized by document sections 132. For example, address, email address, physical address, and phone number may be in document section 132 titled personal information; university attended, grade point average (GPA), degree, major and/or focus of study, minor, extracurricular activities, and accolades may be in document section 132 titled education. Document sections 132 may have the same or similar categories as profile sections 116. As used in this disclosure, a "document subsection" is a subsection under a document section 132. Document subsection 136 may distinguish separate listings within document section 132. For example, under document section 132 for education, each document subsection 136 may be for a different educational institution such as a high school, a university where user obtained a bachelor's degree, and/or a university where the user obtained a graduate degree. Document subsection 136 may be identified by a subheading. For example, subheading my identify the educational institution by name. Document content 128 within each document subsection 136 may include information pertaining to the identified educational institution, for example, grade point average (GPA), degree, major and/or focus of study, minor, extracurricular activities, and accolades.

Still referring to FIG. 1, processor 104 may identify a plurality of document sections 132 in user file 120 by identifying distinguishing features that show a new section. For example, spacing between parts of document content 128 may separate document sections 132. A heading may identify the category of a document section 132 it precedes. Heading may be identified by font larger than the font of subsequent text; stylized font such as bold, italics, and/or underlined font; indentation; and/or the like. Processor 104 may then categorize a first document section 132 of document sections 132 of user file 120. As used in this disclosure, to "categorize" means to associate content with a category, such as one of the categories described in this disclosure. Categorize may also include analyzing the content to determine the category with which to associate the content. Categorizing may be based on profile section 116. Processor 104 may compare a category of document section 132, for example a heading of the document section 132, to profile sections 116. Processor 104 may match document section 132 to one of profile sections 116. Document section 132 may be matched to one of profile sections 116 when a category of document section 132, which may be identified by a heading of the document section 132, is the same or similar to a category of one of profile sections 116. Processor 104 may be connected to or have access to a database or memory, such as memory 124, with a bank of synonyms to determine whether categories are similar. For example, if document section 132 has a heading titled "Education" and one of profile sections 116 is a category "Education," then document section 132 is matched to the one of profile sections 116. If document section 132 has a heading titled "College", "University", "School", or the like, then document section 132 is matched to the profile section 116 with category "Education." If user file 120 does not include headings for document sections 132, then processor 104 may analyze document section 132 for keywords to determine a category for the document section 132. For example, if document section 132 includes words such as "college," "university," "GPA," and/or the like, processor 104 may identify these words as keywords associated with education, categorize the document section 132 as education, and match the document section 132 to profile section 116 that has the category of education.

With continued reference to FIG. 1, processor 104 may identify at least a document subsection 136 of first document section 132. A first of document subsection 136 may be identified as beginning subsequent to heading of document section 132, subsequent to a space in document content 128 if heading is absent, and/or beginning with a subheading as discussed above. Subheading may be identified by font larger than the font of subsequent text but smaller or equal in size to preceding text; stylized font such as bold, italics, and/or underlined font; indentation; and/or the like. A first of document subsection 136 may be identified as ending at a punctuation such as a period or semicolon, a bullet point, a number, where a line has ended by a enter key or return key, and/or the like. Subsequent document subsections 136 and/or parts within document subsections 136 may be identified as between punctuation such as a period or semicolon, a bullet point, a number, where a line has ended by a enter key or return key, spacing in document content 128, and/or the like. A part within document subjects may list one or more separable details pertaining to document subjection. For example, part within document subsection 136 may list GPA, major, and/or the like for subsection of a specified educational institution under section for education. Part within subsection may list a responsibility of user, position, and/or the like for a job for subsection of a specified employer under section for previous employment. Processor 104 may then categorize document content 128 in a first document subsection of document subsections 136. Categorizing document subsection 136 may include analyzing a syntax and/or diction of document content 128 within document subsection 136. For example, processor 104 may determine a part of speech of a first word in part within document subsection 136, such as whether the part within document subsection 136, following any heading, begins with an article adjective, gerund, noun, or the like. Processor 104 may determine a part of speech of all words in document subsection 136. Processor 104 may determine a pattern among the parts within subsection. Processor 104 may determine a syntax and/or diction of user file 120 based on the above analysis of part within document subsection 136.

Still referring to FIG. 1, in one or more embodiments, processor 104 may implement one or more compatibility algorithms or generate one or more compatibility machine-learning modules to parse document content 128 such as to identify document sections 132 in user file 120, categorize a first document section 132 of document sections 132 of user file 120, identify at least a document subsection 136 of first document section 132, and/or categorize document content 128 in a first document subsection 136 of document subsection 136. In one or more embodiments, the machine-learning module may be generated using training data. Training data may include inputs and corresponding predetermined outputs so that a machine-learning module may use the correlations between the provided exemplary inputs and outputs to develop an algorithm and/or relationship that then allows the machine-learning module to determine its own outputs for inputs. Training data may contain correlations that a machine-learning process may use to model relationships between two or more categories of data elements. The exemplary inputs and outputs may come from a database, such as any database described in this disclosure, or be provided by a user, such as a prospective employee and/or an employer. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Training data may be obtained from and/or in the form of previous user files and the resulting document content 128 added to user profile 108. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements.

Processor 104 may implement a compatibility algorithm or generate a compatibility machine-learning module, such as section identifier module 140, to output identified document sections 132 in user file 120. Section identifier module 140 may be generated using training data, such as section identifier data. Section identifier data may be trained by correlating inputs and outputs. Inputs of section identifier data may include user files 120 with document sections 132. Outputs of section identifier data may include the corresponding documents sections. Training data may be user files 120 with document section 132 that have already been identified whether manually, by machine, or any other method. Section identifier module 140 using a machine-learning process may output identified of document sections 132 based on input of a user file and section identifier data.

Processor 104 may implement a compatibility algorithm or generate a compatibility machine-learning module, such as section categorizer module 144, to output categorized document section 132. Section categorizer module 144 may be generated using training data, such as section categorizer data. Section categorizer data may be trained by correlating inputs and outputs. Inputs of section categorizer data may include document sections 132 and corresponding categories of the document sections 132. Inputs may also include corresponding profile sections 116. Outputs of section categorizer data may include the corresponding assigned categories, which may be based on categories in user profile 108. Training data may be document sections 132 that have already been categorized, whether manually, by machine, or any other method, and their corresponding categories. Training data may also include corresponding profile sections 116 to which content from document sections 132 were added. Section categorizer module 144 using a machine-learning process may output categorized document sections 132 based on input of document sections 132 and section categorizer data and optionally profile sections 116.

With continued reference to FIG. 1, processor 104 may implement a compatibility algorithm or generate a compatibility machine-learning module, such as subsection identifier module 148, to output identified document subsections 136 in user file 120. Subsection identifier module 148 may be generated using training data, such as subsection identifier data. Subsection identifier data may be trained by correlating inputs and outputs. Inputs of subsection identifier data may include user files with document subsections 136. Outputs of subsection identifier data may include the corresponding documents subsections. Subsection identifier module 148 using a machine-learning process may output identified of document subsections 136 based on input of a user file and subsection identifier data.

Processor 104 may implement a compatibility algorithm or generate a compatibility machine-learning module, such as subsection categorizer module 152, to output categorized document content 128 in document subsection 136. Subsection categorizer module 152 may be generated using training data, such as subsection categorizer data. Subsection categorizer data may be trained by correlating inputs and outputs. Inputs of subsection categorizer data may include document subsections 136 and corresponding categories of the document subsections 136. Inputs may also include corresponding profile content 112. Outputs of subsection categorizer data may include the corresponding assigned categories, which may be based on categories in user profile 108. Training data may be document subsections 136 that have already been categorized, whether manually, by machine, or any other method, and their corresponding categories. Training data may also include corresponding profile sections 116 to which content from document subsections 136 were added. Subsection categorizer module 152 using a machine-learning process may output categorized document subsections 136 based on input of document subsections 136 and subsection categorizer data and optionally profile sections 116.

Still referring to FIG. 1, section identifier module 140 may use a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. For example, section identifier module 140 may classify document sections 132 based on headings and/or document content 128 within each of the document sections 132 as discussed above.

Still referring to FIG. 1, processor 104 may be configured to generate a classifier using a Naive Bayes classification algorithm. Naive Bayes classification algorithm generates classifiers by assigning class labels to problem instances, represented as vectors of element values. Class labels are drawn from a finite set. Naive Bayes classification algorithm may include generating a family of algorithms that assume that the value of a particular element is independent of the value of any other element, given a class variable. Naive Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naive Bayes algorithm may be generated by first transforming training data into a frequency table. Processor 104 may then calculate a likelihood table by calculating probabilities of different data entries and classification labels. Processor 104 may utilize a naive Bayes equation to calculate a posterior probability for each class. A class containing the highest posterior probability is the outcome of prediction. Naive Bayes classification algorithm may include a gaussian model that follows a normal distribution. Naive Bayes classification algorithm may include a multinomial model that is used for discrete counts. Naive Bayes classification algorithm may include a Bernoulli model that may be utilized when vectors are binary.

With continued reference to FIG. 1, processor 104 may be configured to generate classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, in some embodiments, processor 104 may query a keyword with a text search. Keyword may include words relating to skills such as C++, Java, Computer Aided Design (CAD), welding, Excel, etc. Keyword may include education background such as Master of Science (MS), Bachelor of Science (BS), Juris Doctor (JD), and the like. Text search may include techniques for searching a single computer-stored document or a collection of documents, for example in a database. Text search may include full-text search. Full-text search may be distinguished from searches based on metadata or on field-based searching (e.g., fields such as titles, abstracts, selected sections, or bibliographical references). In an exemplary full-text search, processor 104 may examine all words in every stored document as it tries to match search criteria (for example, keywords). Alternatively, a text search may be limited to fields, such as with field-based searching.

With continued reference to FIG. 1, in some embodiments, text searching may include querying. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In some cases, querying of at least a video element may include any number of querying tools, including without limitation keywords (as described above), field-restricted search, Boolean queries, phrase search, concept search, concordance search, proximity search, regular expression, fuzzy search, wildcard search, and the like. In some cases, keywords may be used to perform a query. In some cases, a document (or trained indexers) may supply a list of words that describe subject of the document, including without limitation synonyms of words that describe the subject. In some cases, keywords may improve recall, for instance if the keyword list includes a keyword that is not in text of a document. In some cases, querying tools may include field-restricted search. A field-restricted search may allow a queries scope to be limited to within a particular field within a stored data record, such as "Title" or "Author." In some cases, a query tool may include Boolean queries. Searches that use Boolean operators (for example, "encyclopedia" AND "online" NOT "Encarta") can dramatically increase precision of a search. In some cases, an AND operator may say, in effect, "Do not retrieve any document unless it contains both of these terms." In some cases, a NOT operator may say, in effect, "Do not retrieve any document that contains this word." In some cases, a retrieval list retrieving too few documents, may prompt and OR operator to be used in place of an AND operator to increase recall; consider, for example, "encyclopedia" AND "online" OR "Internet" NOT "Encarta." This search will retrieve documents about online encyclopedias that use the term "Internet" instead of "online." In some cases, search precision and recall are interdependent and negatively correlated in text searching. In some cases, a query tool may include phrase search. In some cases, a phrase search may match only those documents that contain a specified phrase. In some cases, a query tool may include a concept search. In some cases, a concept search may be based on multi-word concepts, for example compound term processing. In some cases, a query tool may include a concordance search. In some cases, a concordance search may produce an alphabetical list of all principal words that occur in a text and may include their immediate context. In some cases, a query tool may include a proximity search. In some cases, a proximity search matches only those documents that contain two or more words that are separated by a specified number of words, are in the same sentence, or an in the same paragraph. A query tool may include a regular expression. In some cases, a regular expression may employ a complex but powerful querying syntax that can be used to specify retrieval conditions with precision, for instance database syntax. A query tool may include a fuzzy search. In some cases, a fuzzy search may search for a document that matches given terms while allowing for some variation around them. In some cases, a query tool may include a wildcard search. In some cases, a wildcard search may substitute one or more characters in a search query for a wildcard character such as an asterisk. For example, using a wildcard, such as an asterisk, in a search query "s*n" will search for terms inclusive of "sin," "son," "sun," and the like.

With continued reference to FIG. 1, processor 104 may be configured to insert document content 128 in at least one profile section of profile sections 116 based on the categorization of first document section 132 and the categorization of first document subsection 136. As discussed above, processor 104 may match document section 132 to one of profile sections 116 when a category of document section 132, which may be identified by a heading of the document section 132, is the same or similar to a category of one of profile section 116. Processor 104 may then insert document content 128 from document section 132 into profile section 116. Processor 104 may insert heading of document section 132, subheading of document subsection 136, and/or document content 128 other than heading and subheading. Processor 104 may insert document content 128 using the performed syntax and/or diction analysis of document content 128. Processor 104 may have a predetermined syntax, diction, and/or formatting for user profile 108 to which it converts document content 128. For example, user profile 108 may list PGA first after each subsection of an educational institution under section education, and/or user profile 108 may list responsibilities of user for previous employment beginning with a gerund, etc. If user profile 108 has existing profile content 112, processor 104 may convert syntax, diction, and/or formatting of document content 128 to match that of profile content 112. Processor 104 may be configured to post a digitally signed assertion in an immutable sequential listing 200, as discussed with reference to FIG. 7, to record the added content.

Processor 104 may be configured to adapt document content 128 based on profile content 112. For example, processor 104 may be configured to adapt document content 128 based on a diction of profile content 112. Processor 104 may be configured to check for redundancies between document content 128 and profile content 112 so information is not repeated on user profile 108 once document content 128 is incorporated into profile content 112. As used in this disclosure, a "redundancy" is when content includes the same information multiple times. Redundancy may include the same information that are not verbatim, such as in different syntax, diction, and/or formatting. For example, processor 104 may identify document content 128 containing "grade point average: 3.2" for "West City High" is redundant to profile content 112 "GPA: 3.2" for "West City High School". Processor 104 may be configured to provide syntax, diction, and/or formatting options for inserting document content 128 in user profile 108. As used in this disclosure, "syntax" is the arrangement of words and/or phrases. As used in this disclosure, "diction" is the choice and use of words and/or phrases in speech or writing. As used in this disclosure, "formatting" is how information and/or a document is formatted. Processor 104 may provide example of various syntax, diction, and/or formatting using the same content to show how it would appear differently based upon the option.

Within continued reference to FIG. 1, processor 104 may use a language processing module to detect synonymous terms and/or phrases and identify redundancies among profile content 112 and documents content 128 that is not verbatim. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or [computing device] may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, processor may be configured to restrict viewing of at least a portion of the profile content 112 to some or all other users. This is beneficial if user considers some or all of profile content 112 to be sensitive or personal information and would want to control who is able to view the information on user profile 108. For example, portions or all of profile content 112 may be hidden from other users who are not contacts of user or for whom the user has not given express permission. Portions of profile content 112 that may be hidden include, for example, parts of document subsection 136 such as PGA and responsibilities at previous employment, entire subsections, all document content 128 excluding heading of document sections 132 and subheadings of document subsections 136. Processor 104 may require different identifier data, such as proof of identification, associated with different content areas of user profile 108, wherein each identifier data may be restricted from other identifier data. Additional disclosure related to identifier data can be found in U.S. patent application Ser. No. 17/667,441, filed on Feb. 8, 2022 entitled "APPARATUSES AND METHODS FOR LINKING ACTION DATA TO AN IMMUTABLE SEQUENTIAL LISTING IDENTIFIER OF A USER," the entirety of which in incorporated herein by reference.

Figure 2:
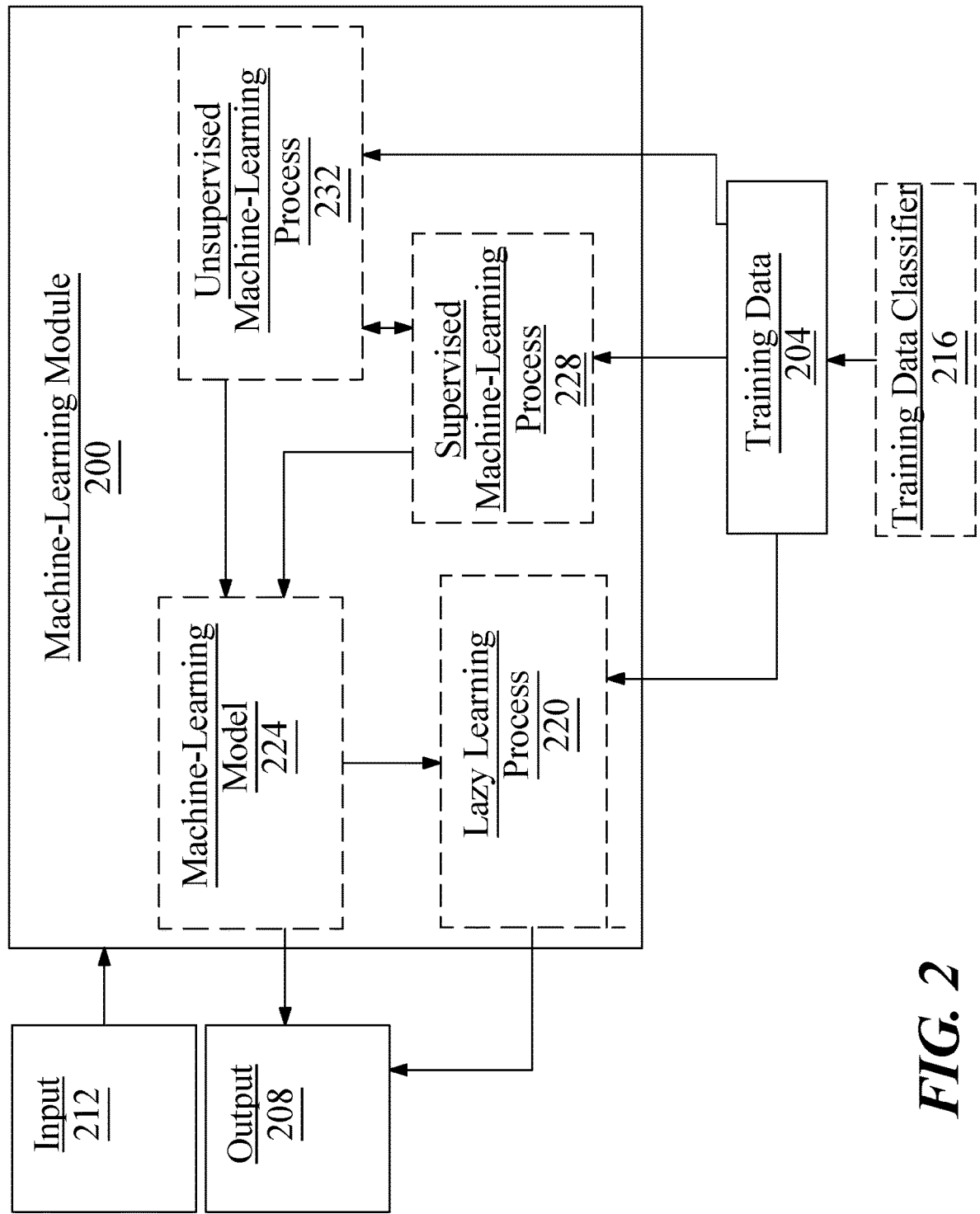
FIG. 2 is a block diagram of exemplary machine-learning processes.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a processor 104/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine learning module 200 may correlate any input data as described in this disclosure to any output data as described in this disclosure. As a non-limiting illustrative inputs may include subject-specific data and outputs may include description-specific data.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum 112 that labels or otherwise identifies a set of data that are clustered together, found to be close under a distance metric as described below, or the like. Machine learning module 200 may generate a classifier using a classification algorithm, defined as a process whereby a processor 104 and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to according to fields of job description for instance, title, role, organization, requisite experience, requisite credentials 128, and the like.

Still referring to FIG. 2, machine learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum 112. As a further non-limiting example, a machine-learning model 224 may be generated by creating an artificial neural network, such as a convolutional neural network including an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include subject-specific data as described above as inputs, description-specific data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
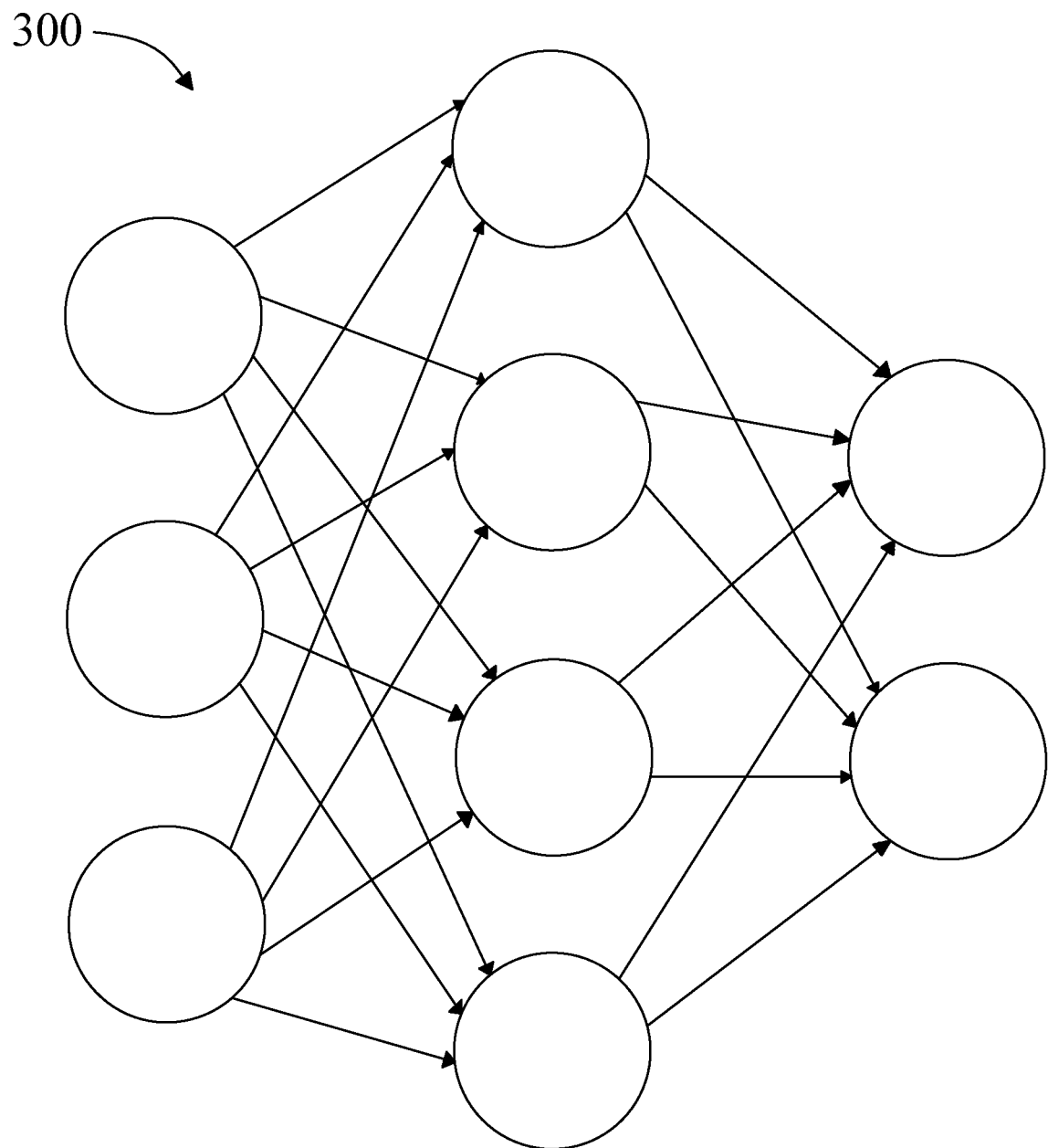
FIG. 3 illustrates an exemplary nodal network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 4:
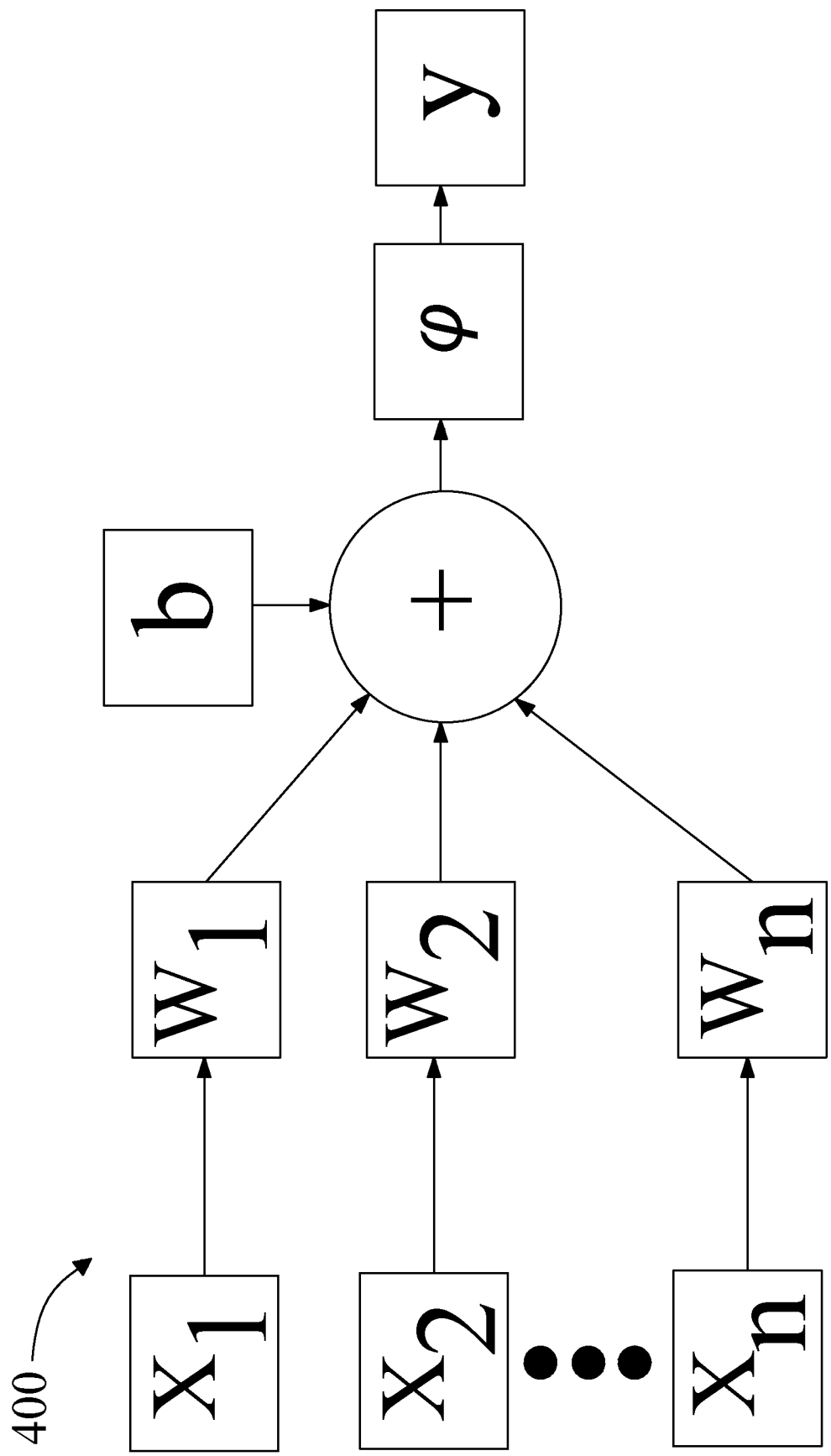
FIG. 4 is a block diagram of an exemplary node.

Referring now to FIG. 4, an exemplary embodiment of a node 400 of a neural network is illustrated. Node 400 may include, without limitation a plurality of inputs x; that may receive numerical values from inputs to a neural network containing the node and/or from other nodes. Node may perform a weighted sum of inputs using weights w, that are multiplied by respective inputs xi. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight w, applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w, may be determined by training a neural network using training data, which may be performed using any suitable process as described above.

Figure 5:
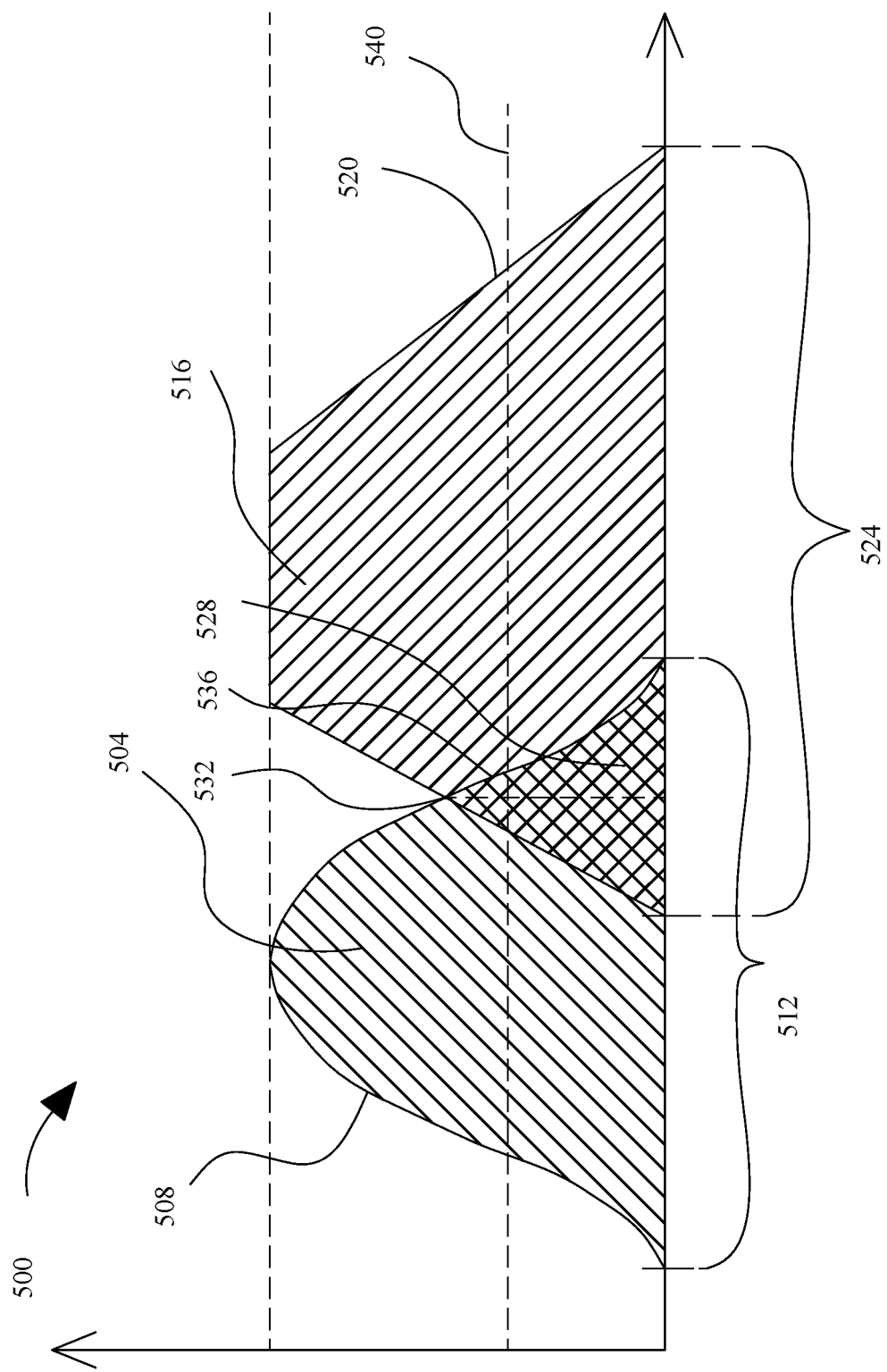
FIG. 5 is a graph illustrating an exemplary relationship between fuzzy sets.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more processes (e.g., machine-learning models), subject-specific data, and description-specific data. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and/or subject-specific data and a predetermined class, such as without limitation a job description, for combination to occur as described above. Alternatively or additionally, each threshold may be tuned by a machine-learning and/or statistical process, for instance and without limitation as described in further detail below.

Further referring to FIG. 5, in an embodiment, a degree of match between fuzzy sets may be used to classify a subject 120 with at least a job description 152a-n. For instance, if subject-specific data has a fuzzy set matching a job description fuzzy set by having a degree of overlap exceeding a threshold, processor 104 may classify the subject as being relevant or otherwise associated with the job description. Where multiple fuzzy matches are performed, degrees of match for each respective fuzzy set may be computed and aggregated through, for instance, addition, averaging, or the like, to determine an overall degree of match.

Still referring to FIG. 5, in an embodiment, subject-specific data may be compared to multiple class fuzzy sets representing job-descriptions. For instance, subject-specific data may be represented by an individual fuzzy set that is compared to each of the multiple class fuzzy sets; and a degree of overlap exceeding a threshold between the individual fuzzy set and any of the multiple class fuzzy sets may cause processor 104 to classify the subject as belonging to a job description. For instance, in one embodiment there may be two class fuzzy sets, representing a first job description and a second job description. First job description may have a first fuzzy set; second job description may have a second fuzzy set; and subject-specific data may have an individual fuzzy set. Processor 104, for example, may compare an individual fuzzy set with each of first fuzzy set and second fuzzy set, as described above, and classify a subject to either, both, or neither of first job description nor second job description. Machine-learning methods as described throughout may, in a non-limiting example, generate coefficients used in fuzzy set equations as described above, such as without limitation x, c, and a of a Gaussian set as described above, as outputs of machine-learning methods. Likewise, subject-specific data may be used indirectly to determine a fuzzy set, as the fuzzy set may be derived from outputs of one or more machine-learning models that take the subject-specific data directly or indirectly as inputs. Although an exemplary application for fuzzy set matching is described above, fuzzy set matching may be used for any classifications or associations described within this disclosure.

Figure 6:
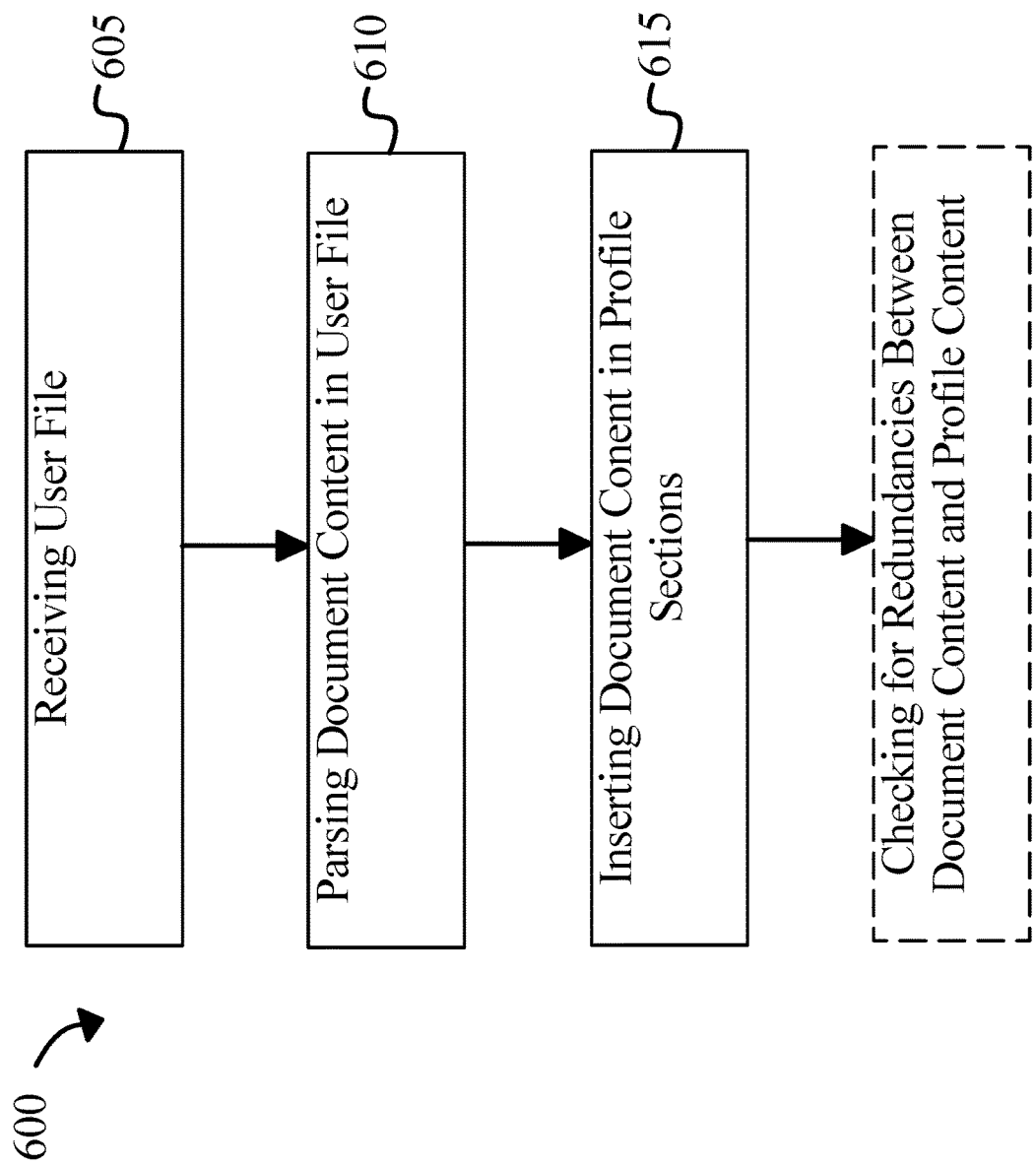
FIG. 6 is a flow diagram of an exemplary method for matching video resumes with job listings.

Now referring to FIG. 6, an exemplary embodiment of a method 600 for updating a user profile based on a user file is illustrated. At step 605, a processor receives a user file; this may be implemented, without limitation, as described above in reference to FIGS. 1-6.

At step 610, processor parses document content in user file by: identifying a plurality of document sections in user file, categorizing a first document section of plurality of document sections of resume, identifying at least a document subsection of the first document section, and categorizing the content in a first document subsection of the at least a document subsection; this may be implemented, without limitation, as described above in reference to FIGS. 1-6. Processor may be configured to use a machine-learning process for parsing. Processor may be configured to identify a part within document subsection. Processor may be configured to analyze part within document subsection. A part within document subjects may list one or more separable details pertaining to document subjection. For example, part within document subsection may list GPA, major, and/or the like for subsection of a specified educational institution under section for education. Part within subsection may list a responsibility of user, position, and/or the like for a job for subsection of a specified employer under section for previous employment. Processor may then categorize document content in a first document subsection of document subsections. Categorizing document subsection may include analyzing a syntax and/or diction of document content within document subsection. For example, processor may determine a part of speech of a first word in part within document subsection, such as whether the part within document subsection, following any heading, begins with an article adjective, gerund, noun, or the like. Processor may determine a part of speech of all words in document subsection. Processor may determine a pattern among the parts within subsection. Processor may determine a syntax and/or diction of user file 120 based on the above analysis of part within document subsection. Processor may be configured to determine a diction of user file based on analysis of part within document subsection.

At step 615, processor inserts document content in at least one of plurality of profile sections based on categorization of first document section and categorization of the first document subsection; this may be implemented, without limitation, as described above in reference to FIGS. 1-6. Processor may be configured to check for redundancies between document content and profile content. Processor may be configured to adapt document content based on profile content. Processor may be configured to adapt document content based on a diction of profile content. Processor may be configured to provide diction options for inserting document content in user profile. Processor may be configured to restrict a viewing of at least a portion of profile content.

Figure 7:
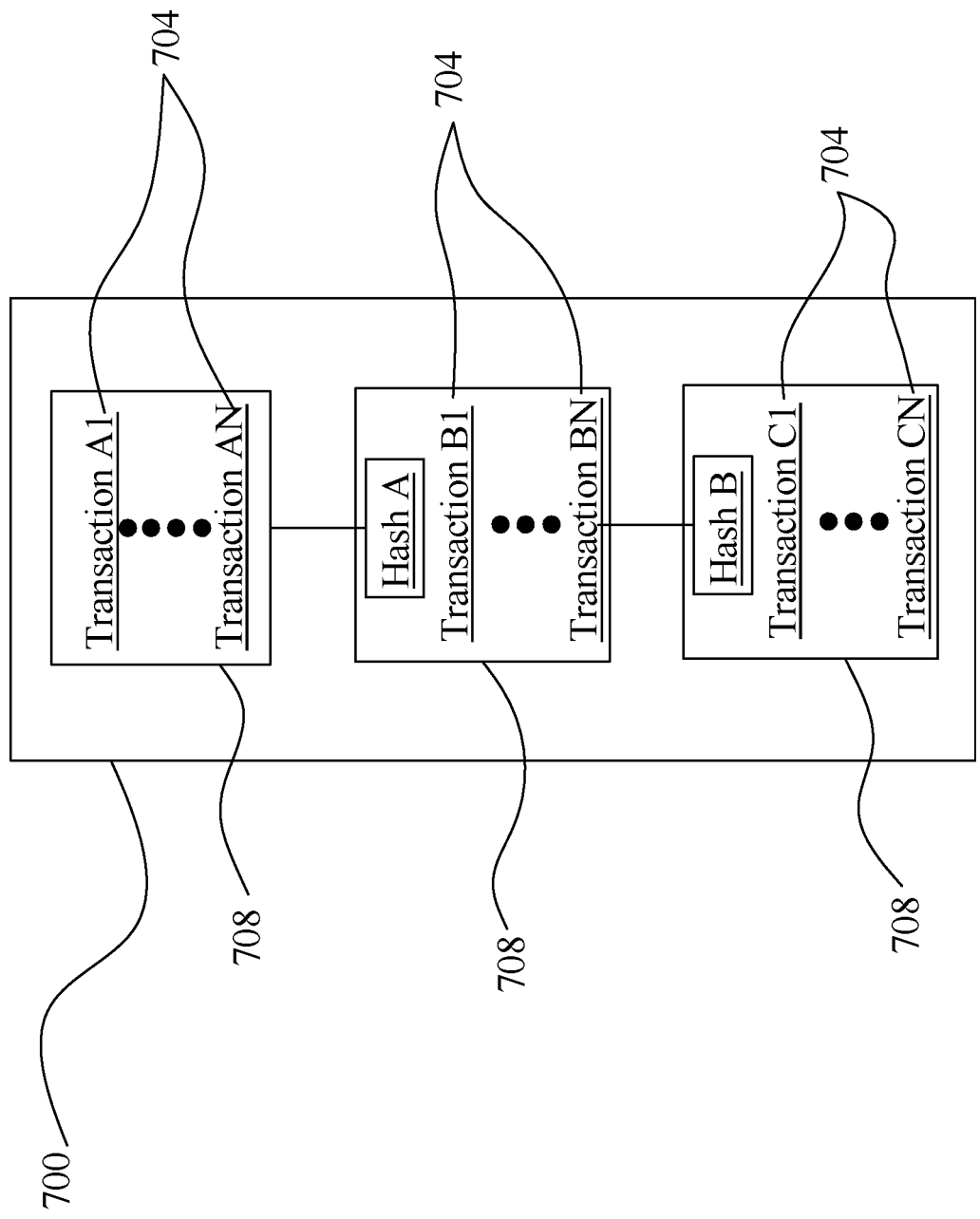
FIG. 7 is a block diagram of an exemplary immutable sequential listing.

Referring now to FIG. 7, an exemplary embodiment of an immutable sequential listing 700 is illustrated. Data elements are listing in immutable sequential listing 700; data elements may include any form of data, including textual data, image data, encrypted data, cryptographically hashed data, and the like. Data elements may include, without limitation, one or more at least a digitally signed assertion. In one embodiment, a digitally signed assertion 704 is a collection of textual data signed using a secure proof as described in further detail below; secure proof may include, without limitation, a digital signature. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 704. In an embodiment, collection of textual data states that the owner of a certain transferable item represented in a digitally signed assertion 704 register is transferring that item to the owner of an address. A digitally signed assertion 704 may be signed by a digital signature created using the private key associated with the owner's public key, as described above.

Still referring to FIG. 7, in some embodiments, an address is a textual datum identifying the recipient of virtual currency or another item of value, such as user file 120, in a digitally signed assertion 704. In some embodiments, address may be linked to a public key, the corresponding private key of which is owned by the recipient of a digitally signed assertion 704. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 704 may record a subsequent a digitally signed assertion 704 transferring some or all of the value transferred in the first a digitally signed assertion 704 to a new address in the same manner. A digitally signed assertion 704 may contain textual information that is not a transfer of some item of value in addition to, or as an alternative to, such a transfer. For instance, as described in further detail below, a digitally signed assertion 704 may indicate a confidence level associated with a distributed storage node as described in further detail below.

In an embodiment, and still referring to FIG. 7 immutable sequential listing 700 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 700 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 7, immutable sequential listing 700 may preserve the order in which the at least a posted content took place by listing them in chronological order; alternatively or additionally, immutable sequential listing 700 may organize digitally signed assertions 704 into sub-listings 708 such as "blocks" in a blockchain, which may be themselves collected in a temporally sequential order; digitally signed assertions 704 within a sub-listing 708 may or may not be temporally sequential. Profile content 112, profile sections 116, user file 120, document content 128, documents sections 132, and/or document subsections 136 may be posted on immutable sequential listing 700, such as blockchain. Training data for any machine-learning module discussed in this disclosure may be posted on immutable sequential listing 700, such as blockchain. A master list may be included. Master list may include a hash-table and/or distributed hash table which may be used to locate a requestor-linked data store. For example, a public key associated with a requestor containing location information pertaining to requestor-linked data store may be converted into a series of hash functions. This may occur by converting an entry into a series of integers by using a hash function. A hash function may include any function that may be used to map a set of data which falls into the hash table. Hash functions may be stored in a hash table, where it can be quickly retrieved using a hashed key. The hashed key may then be used to access requestor-linked data store when prompted. Using the hashed key, a hash function may compute an index that may suggest where requestor-linked data store may be found. Locating may also be performed by linking the at least an encrypted data record to a digital signature associated with the requestor. Requestor may produce a digital signature, which may then be linked to the at least an encrypted data record and locate to the location of the at least an encrypted data record. When the digital signature is presented, it may contain location information of the at least an encrypted data record and allow access control regulator to locate the precise location of encrypted data record. For example, digital signature may be generated using a public and/or private key linked to requestor which may contain location information of encrypted data record. In an embodiment, encrypted data record may be linked to a requestor key, so that when a requestor key is presented, location of encrypted data record becomes apparent. Locating may also be performed by information that may be contained in data access request. For example, a data access request associated with a user may contain location information of encrypted data record that requestor is attempting to access. When generating a data access request, requestor may specify the location of encrypted data record that may then be transmitted to access control regulator. Additional disclosure pertaining to immutable sequential listing can be found in U.S. patent application Ser. No. 17/486,461 filed on Sep. 27, 2021, and entitled "SYSTEMS AND METHODS FOR SCORE GENERATION FOR APPLICANT TRACKING", the entirety of which in incorporated herein by reference.

With continued reference to FIG. 7, the ledger may preserve the order in which at least a posted content took place by listing them in sub-listings 708 and placing the sub-listings 708 in chronological order. The immutable sequential listing 700 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 700 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 7, immutable sequential listing 700, once formed, may be inalterable by any party, no matter what access rights that party possesses. For instance, immutable sequential listing 700 may include a hash chain, in which data is added during a successive hashing process to ensure non-repudiation. Immutable sequential listing 700 may include a block chain. In one embodiment, a block chain is immutable sequential listing 700 that records one or more new at least a posted content in a data item known as a sub-listing 708 or "block." An example of a block chain is the BITCOIN block chain used to record BITCOIN transactions and values. Sub-listings 708 may be created in a way that places the sub-listings 708 in chronological order and link each sub-listing 708 to a previous sub-listing 708 in the chronological order so that any computing device may traverse the sub-listings 708 in reverse chronological order to verify any at least a posted content listed in the block chain. Each new sub-listing 708 may be required to contain a cryptographic hash describing the previous sub-listing 708. In some embodiments, the block chain may contain a single first sub-listing 708 sometimes known as a "genesis block."

Still referring to FIG. 7, the creation of a new sub-listing 708 may be computationally expensive; for instance, the creation of a new sub-listing 708 may be designed by a "proof of work" protocol accepted by all participants in forming the immutable sequential listing 700 to take a powerful set of computing devices a certain period of time to produce. Where one sub-listing 708 takes less time for a given set of computing devices to produce the sub-listing 708, protocol may adjust the algorithm to produce the next sub-listing 708 so that it will require more steps; where one sub-listing 708 takes more time for a given set of computing devices to produce the sub-listing 708, protocol may adjust the algorithm to produce the next sub-listing 708 so that it will require fewer steps. As an example, protocol may require a new sub-listing 708 to contain a cryptographic hash describing its contents; the cryptographic hash may be required to satisfy a mathematical condition, achieved by having the sub-listing 708 contain a number, called a nonce, whose value is determined after the fact by the discovery of the hash that satisfies the mathematical condition. Continuing the example, the protocol may be able to adjust the mathematical condition so that the discovery of the hash describing a sub-listing 708 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 708 according to the protocol is known as "mining." The creation of a new sub-listing 708 may be designed by a "proof of stake" protocol as will be apparent to those skilled in the art upon reviewing the entirety of this disclosure.

Continuing to refer to FIG. 7, in some embodiments, protocol also creates an incentive to mine new sub-listings 708. The incentive may be financial; for instance, successfully mining a new sub-listing 708 may result in the person or entity that mines the sub-listing 708 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 708. Each sub-listing 708 created in immutable sequential listing 700 may contain a record or at least a posted content describing one or more addresses that receive an incentive, such as virtual currency, as the result of successfully mining the sub-listing 708.

With continued reference to FIG. 7, where two entities simultaneously create new sub-listings 708, immutable sequential listing 700 may develop a fork; protocol may determine which of the two alternate branches in the fork is the valid new portion of the immutable sequential listing 700 by evaluating, after a certain amount of time has passed, which branch is longer. "Length" may be measured according to the number of sub-listings 708 in the branch. Length may be measured according to the total computational cost of producing the branch. Protocol may treat only at least a posted content contained in the valid branch as valid at least a posted content. When a branch is found invalid according to this protocol, at least a posted content registered in that branch may be recreated in a new sub-listing 708 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 700 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 700.

Still referring to FIG. 7, additional data linked to at least a posted content may be incorporated in sub-listings 708 in the immutable sequential listing 700; for instance, data may be incorporated in one or more fields recognized by block chain protocols that permit a person or computer forming a at least a posted content to insert additional data in the immutable sequential listing 700. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
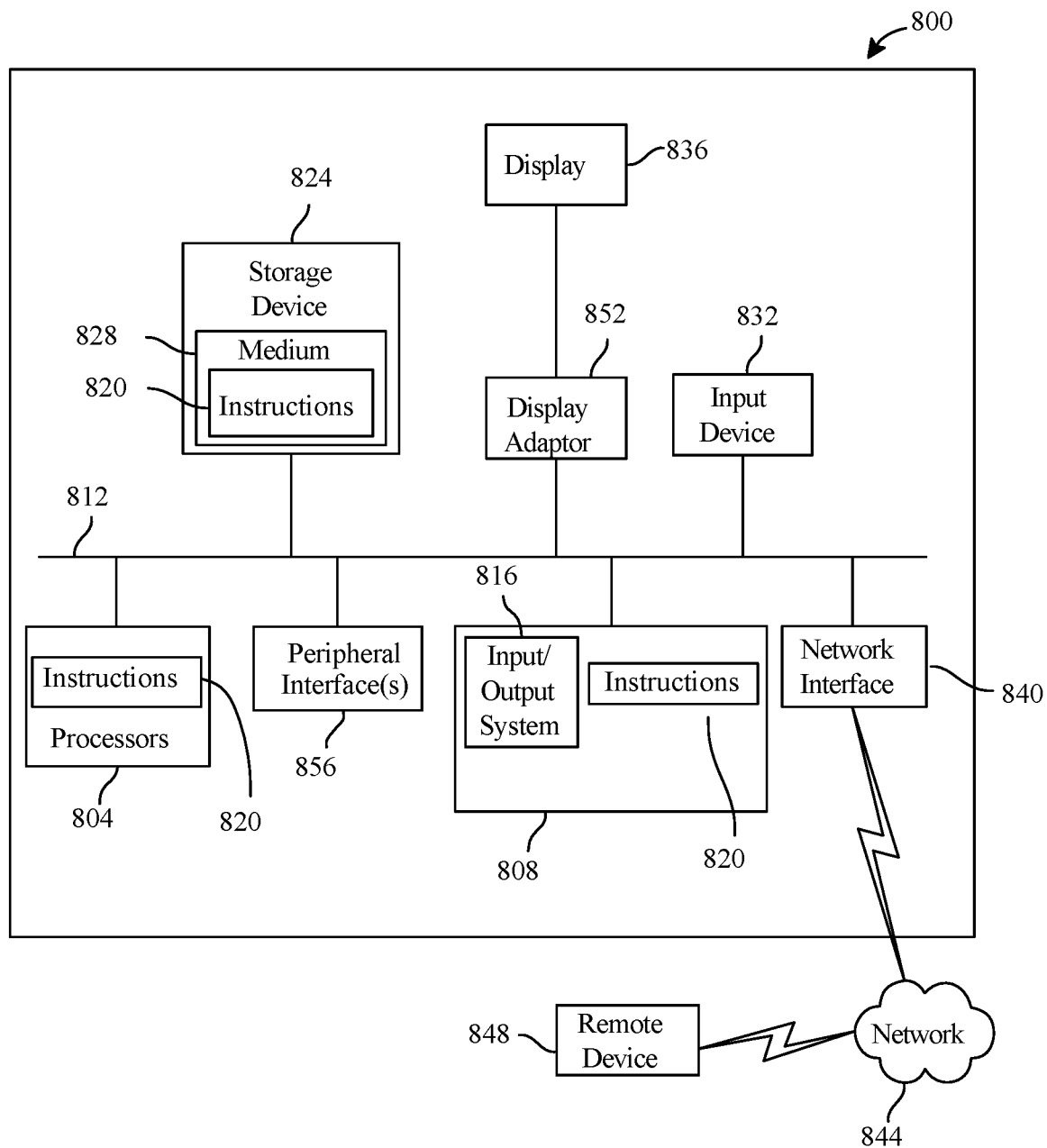
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for updating a user profile based on a user file, the apparatus comprising:
    at least a processor; and
    a memory communicatively connected to the at least a processor, the memory containing instructions configuring the at least a processor to:

identify a plurality of profile sections in a user profile comprising a profile content;
receive a user file;
parse document content in the user file by:
    identifying a plurality of document sections in the user file;
    categorizing a first document section of the plurality of document sections of the user file;
    identifying at least a document subsection of the first document section; and
    categorizing the document content in a first document subsection of the at least a document subsection;
insert the document content in at least one of the plurality of profile sections based on the categorization of the first document section and the categorization of the first document subsection; and
store the document content of the first document subsection in an immutable sequential listing.

2. The apparatus of claim 1, wherein the processor is configured to check for redundancies between the document content and the profile content.

3. The apparatus of claim 1, wherein the processor is configured to adapt the document content based on the profile content.

4. The apparatus of claim 3, wherein the processor is configured to adapt the document content based on a diction of the profile content.

5. The apparatus of claim 1, wherein the processor is configured to provide diction options for inserting the document content in the user profile.

6. The apparatus of claim 1, wherein the processor is configured to use a machine-learning process for parsing.

7. The apparatus of claim 1, wherein the processor is configured to restrict viewing of at least a portion of the profile content.

8. The apparatus of claim 1, wherein the processor is configured to identify a part within the document subsection.

9. The apparatus of claim 8, wherein the processor is configured to analyze the part within the document subsection.

10. The apparatus of claim 8, wherein the processor is configured to determine a diction of the user file based on the analysis of the part within the document subsection.

11. A method for updating a user profile based on a user file, the method comprising:
    identifying a plurality of profile sections in a user profile comprising a profile content;
    receiving a user file;
    parsing document content in the user file by:
        identifying a plurality of document sections in the user file;
        categorizing a first document section of the plurality of document sections of the user file;
        identifying at least a document subsection of the first document section; and
        categorizing the content in a first document subsection of the at least a document subsection;
    inserting the document content in at least one of the plurality of profile sections based on the categorization of the first document section and the categorization of the first document subsection; and
    storing the document content of the first document subsection in an immutable sequential listing.

12. The method of claim 11, wherein the processor is configured to check for redundancies between the document content and the profile content.

13. The method of claim 11, wherein the processor is configured to adapt the document content based on the profile content.

14. The method of claim 13, wherein the processor is configured to adapt the document content based on a diction of the profile content.

15. The method of claim 11, wherein the processor is configured to provide diction options for inserting the document content in the user profile.

16. The method of claim 11, wherein the processor is configured to use a machine-learning process for parsing.

17. The method of claim 11, wherein the processor is configured to restrict a viewing of at least a portion of the profile content.

18. The method of claim 11, wherein the processor is configured to identify a part within the document subsection.

19. The method of claim 18, wherein the processor is configured to analyze the part within the document subsection.

20. The method of claim 19, wherein the processor is configured to determine a diction of the user file based on the analysis of the part within the document subsection.

\* \* \* \* \*